United States Patent [19]

Wheeler

[11] Patent Number: 4,671,146
[45] Date of Patent: Jun. 9, 1987

[54] COMBINATION CONTOUR FORM AND TURNING DEVICE

[75] Inventor: Harold E. Wheeler, Athens, Pa.

[73] Assignee: Wheeler Tool Company, Athens, Pa.

[21] Appl. No.: 795,817

[22] Filed: Nov. 7, 1985

Related U.S. Application Data

[63] Continuation-in-part of Ser. No. 438,566, Nov. 2, 1982, Pat. No. 4,612,834.

[51] Int. Cl.[4] .............................................. B23B 3/28
[52] U.S. Cl. .......................................... 82/19; 29/57; 82/11
[58] Field of Search ..................... 82/11, 18, 19; 29/57

[56] References Cited

U.S. PATENT DOCUMENTS

| | | | |
|---|---|---|---|
| 1,794,390 | 3/1931 | Trobeck | 82/19 |
| 2,355,315 | 8/1944 | MacBlane | 82/11 |
| 3,813,969 | 6/1974 | Wheeler | 82/19 |
| 3,847,043 | 11/1974 | Bechler | 82/19 |
| 4,479,292 | 10/1984 | Wheeler | 82/19 |
| 4,505,627 | 3/1985 | Wheeler | 82/19 |

Primary Examiner—Nicholas P. Godici
Assistant Examiner—Jerry Kearns
Attorney, Agent, or Firm—Edwin E. Greigg

[57] ABSTRACT

A cross slide contour forming box tool and base which can be applied to automatic screw machines for contour forming desired contours of desired width on the outside of a workpiece. The contour forming tool is positioned on a transverse slide perpendicular to the drive axis. The transverse slide is driven by a pin and cam groove in the face of a cam so that the contour forming tool is positioned in accordance with the shape of the cam groove. The workpiece is rotated relative to the contour forming tool and the desired contour is formed on the surface of the workpiece. The contour forming tool is carried by a base including a slide and cam which functions to move the box tool parallel to the center line of the workpiece in order to form a desired contour width.

1 Claim, 3 Drawing Figures

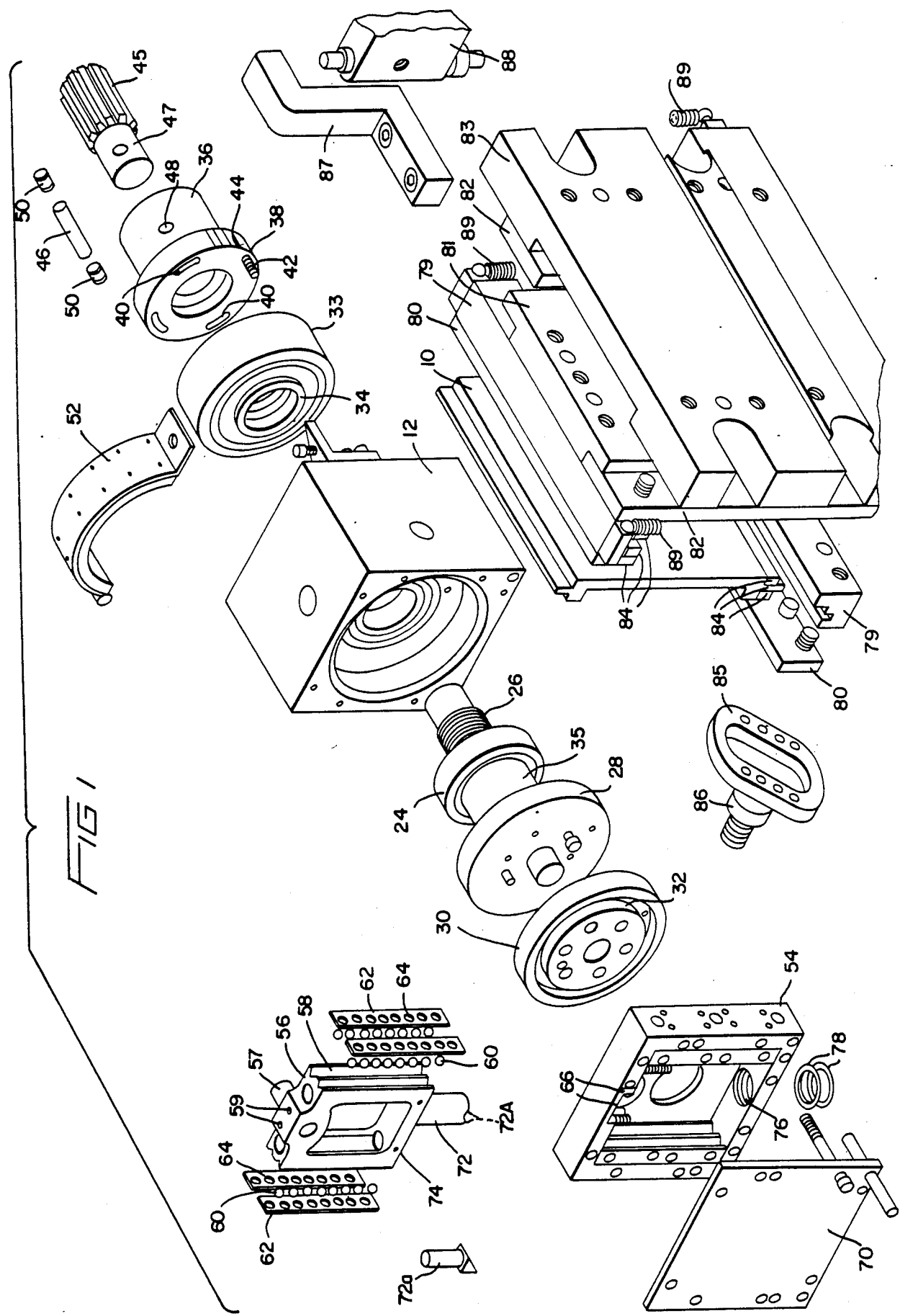

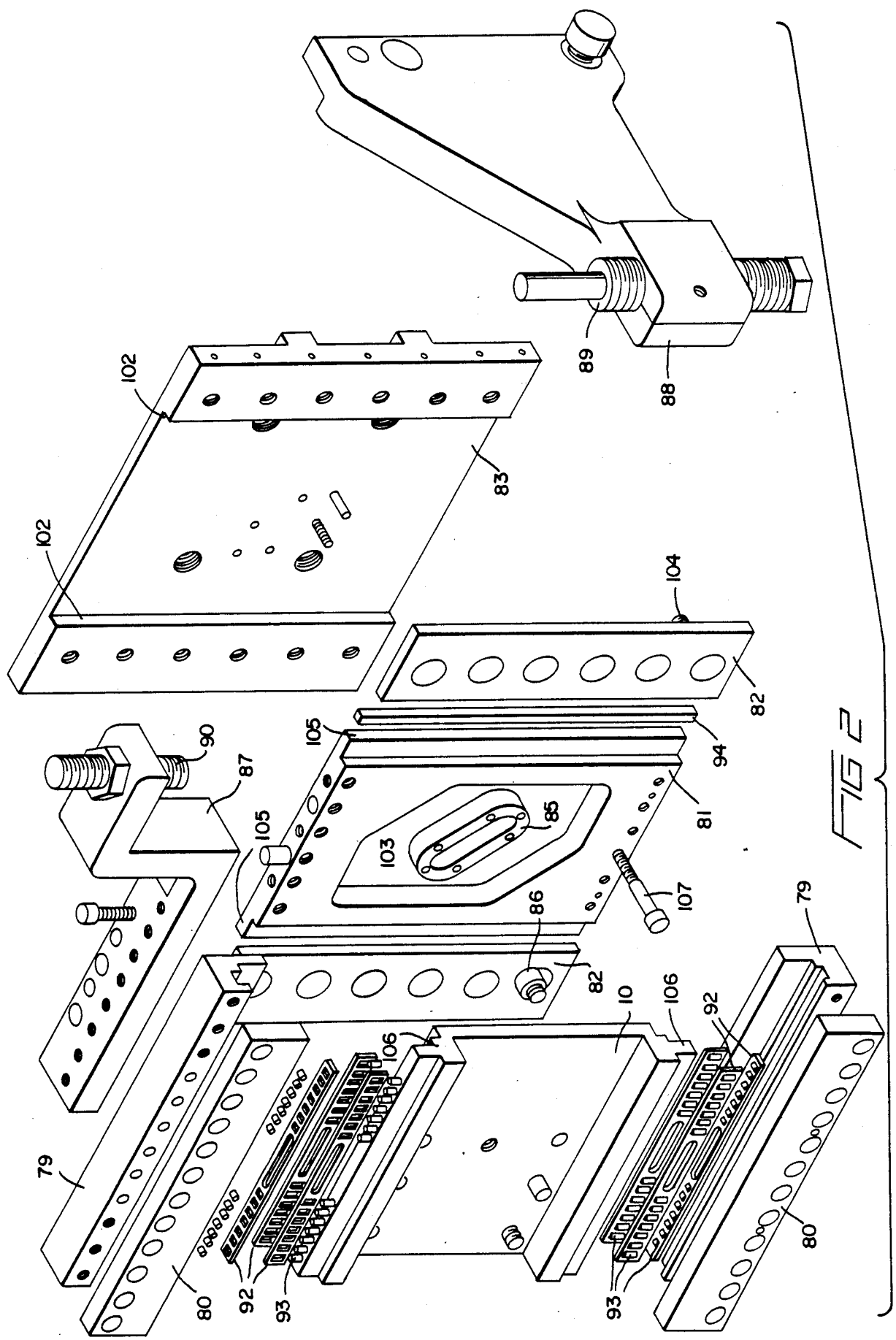

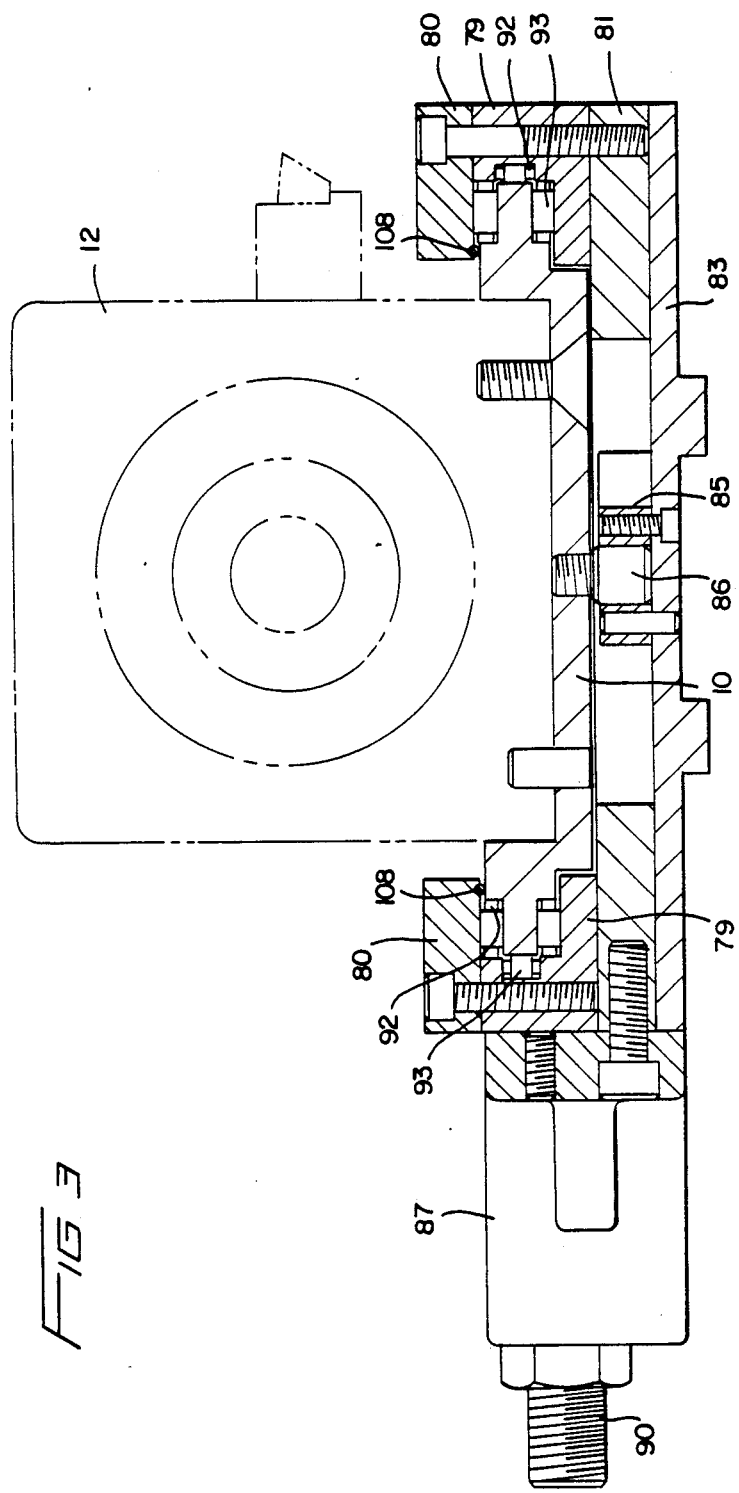

COMBINATION CONTOUR FORM AND TURNING DEVICE

REFERENCE TO OTHER APPLICATION

This application is a Continuation-in-Part of application Ser. No. 438,566 filed Nov. 2, 1982, now U.S. Pat. No. 4,612,834.

BACKGROUND OF THE INVENTION

This invention is directed to a combination contour forming and turning device and more particularly to a contour forming and turning device for forming a contour surface of any desired width behind a shoulder.

The invention pertains to a cam operated box tool secured to a slidable base which is mounted on a cross slide of an Automatic Screw Machine for producing multisided configured outer surfaces of any desired width on a workpiece. It is well know that many parts used in industry are made of bar stock and turned to shape and size before being cut off in an Automatic Screw Machine. This is done because these machines have 4–6 or 8 spindles and may be performing the operations of drilling, tapping, reaming, turning, forming, etc., simultaneously thus producing workpieces at low cost.

Very often these parts need additional milling or contouring operations to complete the workpiece and this is done as a secondary operation, such as milling a flat, etc. on a conventional milling machine. This secondary operation often takes more time than the first Automatic Screw Machine operation and is expensive.

Some attempts to finish the workpiece complete on the Automatic Screw Machines by using Polygon Box Tools to turn flats, contours, etc. have been made. These tools such as described in U.S. Pat. No. 3,813,969 have been made with heavy reciprocating parts and the whole operation has been slowed to the speed at which the Polygon Box Tools would operate. The results have been fewer parts completely contoured, thus showing little overall savings. This invention is an improvement over U.S. Pat. No. 3,813,969 which overcomes the drawbacks found in the patented device and which permits operation of the polygon box tool at the speed of the driving machine such as a screw machine for forming contour of any desired width and behind shoulders.

Additionally, polygon box tools have been provided in which the cam used to actuate the reciprocating parts has been a simple cam capable of moving the parts in one direction only and relying on spring pressure to move the reciprocating parts back in the other direction. Such designs limit the operating speed to the spring pressure capable of maintaining the cam follower in contact with the cam face. Such a device is found in U.S. Pat. No. 3,511,121.

SUMMARY OF THE INVENTION

This invention sets forth a polygon box tool attached to a slide-base which is mounted on an Automatic Screw Machine cross slide and will operate at the speed of the driving machine and uses a grooved face cam which enables one to form different contours of a finished product by use of a screw machine for driving the polygon box tool. The slide base is provided with a cam which permits movement of the base in a direction parallel to the work piece to produce desired contour widths.

In the new device reciprocating form contouring parts are actuated by a grooved face cam, giving positive control of the contouring tool at high speed. Also, the new Polygon Box Tool with the reciprocating parts is much smaller and lighter than the prior art devices and can operate at a much higher speed. The new Polygon Box Tool will operate as fast as the regular set up and form contouring operations are accomplished, resulting in a finished workpiece at no increase in cost over the regular automatic time of one operation. The addition of a slide base and cam permits forming contours of desired widths after the polygon box tool has advanced to a desired depth of the work piece.

The new Polygon Box Tool has been developed for high speed operation and uses a transverse slide weighing about 5 oz. compared to prior art devices which weighed about 40 oz. In addition to a reduction in weight, the cam has a grooved face which allows increased speed. This has resulted in an increase in the operating cam speed from about 250 r.p.m. up to about 2000 r.p.m. which enables an Automatic Screw Machine operator to perform the form contour operations without slowing the usual cycle time. The base slide adds to the ability to form desired widths.

It is therefore an object of this invention to provide a polygon box tool and base slide which makes use of parts which permits operation at the desired speed of the driving machine.

Another object is to make a grooved face cam which is of well rounded development and extremely hard to resist the wear as required to operate contouring tools at desired speeds of the driving machine to carry out the contouring operation.

BRIEF DESCRIPTION OF THE DRAWINGS

FIG. 1 shows an exploded perspective view of the polygon box tool and base slide;

FIG. 2 shows a detailed exploded view of the base slide and base of the polygon box tool; and FIG. 3 is a partial cross sectional view illustrating the mounted cross slide and polygon box tool.

DETAILED DESCRIPTION OF THE INVENTION

Now referring to the drawing, there is shown by example a polygon box tool including a mounting plate 10 to which a main housing 12 is secured with the mounting plate 10 secured to the base slide. The main housing is provided with an axial aperture 14 with equal diameter shoulders 16, 18 from opposite ends and a larger diameter shoulder 20 on the front end. The shoulders 16 and 18 receive therein bearings 22 and 24 which are supported in well known inner and outer bearing races. The outer bearing race fits within the shoulders 16 and 18 with a tight fit and the inner bearing race fits with a tight fit on the small diameter end 26 of a cam shaft which is also provided with a larger diameter end 28. The larger diameter end 28 is secured to a cam 30 which is provided with a groove 32 in its face. The shape of the cam groove is designed so that a desired shape may be contour formed on the outside of a stock piece. The large diameter end 28 of the cam shaft and the grooved face cam operate within the housing 12 in the area surrounded by the larger shoulder area 20 of the housing. The small diameter end of the cam shaft is threaded and passes through the bearings in the housing 23 and threads into a threaded aperture in the first drive link 33. The first drive link is pulled toward the bearing 22 as the cam drive is threaded into the first drive link until the face 34 is against the inner bearing race of bearing 22. A spacer 35 separates the bearings from each other.

The drive link is driven by a second drive link 36 which is provided with a larger diameter end 38 which is provided with equally spaced slots 40 that extend in a circular direction. Bolts 42 pass through the slots 40 and secure the second drive 36 to the first drive link 33. The larger diameter portion of the second drive link 36 is provided with parallel lines 44 that are measured off in degrees, and the second drive link is rotatable with respect to the first drive link so that the position of the cam relative to its drive may be changed. The second drive link is secured to the end 47 of a splined drive shaft 45 by use of a shear pin 46 which passes through the aperture 48 along a diameter of the second drive link. The shear pin may be held in place by use of threaded set screw 50, one on each end. A brake band 52 is provided and secured adjacent the first drive link in order to eliminate backlash of gears and spline causing tool chatter. The brake applies only sufficient pressure to maintain a constant drive force.

A front housing 54 is secured to the housing 12 and supports therein a transverse slide 56. The transverse slide is provided with V-shaped side grooves 58 along which ball bearings 60 are secured by use of supports 62 which are provided with apertures 64 within which each of the ball bearings rests. The transverse slide 56 fits within the front housing and is provided with a cam follower pin 57 which extends into the cam groove 32. The pin is secured to the transverse slide by bolts 59. As the cam is rotated by the drive shaft, drive links and cam shaft, the transverse slide will reciprocate in the vertical plane, if positioned as shown in FIG. 2. Therefore, it is obvious that the transverse slide is of a length which is less than the opening in the front housing 54. Extension springs 66 are provided at the top of the transverse slide for the form contouring operation. The extension springs 68 are secured at one end to the end housing 54 and at their other end to the transverse slide. The springs are provided to counteract rotational forces of the contouring form tool. A front cover 70 encloses the transverse slide by use of any well-known bolt arrangement. The contouring form tool is secured to the transverse slide and reciprocates in aperture 76 in the bottom plate of the front housing. O-ring seals 78 are provided to prevent leakage of oil and to prevent chips from entering into the transverse alide. The contouring form tool 72A is secured within a cylindrical tool holder 72 which extends through the aperture 76 and is secured to the transverse slide so that the cylindrical tool holder for supporting the contouring form tool reciprocates as the transverse slide follows the contour of the cam groove.

The transverse slide is provided with a cam follower 57 which fits into the cam groove 32. The cam groove is formed with a curved path having greater and lesser radii in order to reciprocate the contouring form tool. A workpiece, not shown, is positioned relative to the contouring form tool. In operation, the cam pin 57 follows the contour of the cam as the cam rotates which provides reciprocating movement for the contouring form tool. In order to contour form the workpiece, the workpiece is also rotated. Reciprocation of the contouring form tool forms the desired shape on the workpiece surface.

As set forth above the polygon box tool 12 is secured to base 10 which is mounted in a new base on the machine cross slide for inward movement toward the work piece. The new base includes a backing plate 83 which is secured to a riser block which in turn is secured to a cross slide of the working machine, not shown. The backing plate 83 has spaced parallel end shoulders 102 that provide a cut-out area between thicker flat end surfaces. To the center of the backing plate is secured a 45-degree flat cam 85. A slide 81 having a cut-out 103 that surrounds the cam 85 is slidably secured to the backing plate 83 by use of flat plates 82 along opposite ends by bolts 104. The flat plates extend over end projections 105 of slide 81 such that the thickness of the end projections and the flat plates are substantially the same thickness as the body of the slide 81. Oil seals 94 are provided along the end projections to prevent the flat plate from binding against the end projections of plate 81. The thickness of the body of slide 81 must be such that it is thicker than the cam 85 on backing plate 83.

The base plate 10 of the polygon box tool 12 is formed with end projections 106 which are slidably mounted on rollers 93 that are mounted in retainers 92. The rollers are on each side and along the end projection of the base 109 mounted in grooved retainer 79 and held in place by retainer 80. The retainers 79 and 80 at opposite sides of the base plate 10 are secured to the slide 81 by bolts 107 and is movable relative to backing plate 83. The retainers 79 and 80 are perpendicular to the direction in which the slide 81 moves and seals 108 are used to prevent dirt from going onto the bearings. A cam follower 86 is secured at one end to the base plate 10 with the opposite end within the cam on the backing plate 83.

Since the base plate is mounted on the slide 81 and cam is mounted on the backing plate and moves relative to the slide 81, the base plate 10 is moved along the bearing 92 as it follows the cam form.

A stop bracket 87 is secured to an end of slide 81. The stop bracket 87 contains an adjustable stop screw 90 which contacts an adjustable screw stop 89 which is contained by a stop bracket 88 that is secured to the cross slide. The adjustable screw stop is so positioned that it will contact the machine carrier stop bottom 95 so that the machine carrier movement will be stopped at the proper time.

In operation for contour forming a piece of work, the polygon box tool is assembled with a groove-faced cam of the desired shape and the contouring form tool 72A is secured to the cylindrical tool holder which is secured to the transverse slide which extends through the aperture 76. The polygon box tool is secured to the new base which is secured to the cross slide of an Automatic Screw Machine, not shown, and driven by use of universal joints and the workpiece is placed in a rotatable holder. The workpiece holder and screw machine drive are driven at the same rotational speed. The cam of the polygon box tool will be rotated by the screw machine drive. As the cam is rotated, the cam follower pin will follow the design of the cam, thereby reciprocating the transverse slide and contouring form tool in a vertical line as the cam rotates. As the cam is rotated to reciprocate the transverse slide and contouring form tool in a line, the workpiece is rotated at the same rotational speed in synchronism with the screw machine drive. The contouring form form tool is mounted on the new base which is mounted on the screw machine cross-slide and is moved toward the workpiece to form a design in accordance with the shape of the cam as the workpiece is rotated relative to the cutter. The depth of the cut is obtained by moving the new base and polygon box tool toward the workpiece together without any sliding movement between the parts of the new base.

After the cross-slide has advanced sufficient for the polygon box tool to reach the desired cutting depth due to an inward motion of the polygon box tool and slide 81, the slide 81 is stopped by the adjustable screw 90 becoming in contact with the adjustable stop 89. Adjustable stop 89 then contacts the machine carrier stop button 95 to stop the advance of the slide 81 and the polygon box tool. After the slide 81 has stopped its forward motion, backing plate 83 continues in a forward motion carrying cam 85 along therewith. As the backing plate 83 and cam are moved together, the base 10 and cutting tool are moved in a direction parallel to the center line of the work piece by the cam and cam follower and the contour of the cut is determined by the cam of the polygon box tool as the cutting tool is reciprocated by the cam 32. Therefore, the workpiece is turned to a contour of the shape of cam 32 while having a desired width in accordance with the cam 86.

The device is provided with springs 89 on each side of the slide 81 for returning the slide to its starting position when the cross slide withdraws from an inward cutting position.

The second drive link 36 can be adjustably rotated relative to the first drive link 33 in order to change the orientation of the cam with respect to the drive; therefore, the orientation of the shape of the workpiece will be different. Also, the contouring form tool may be adjusted along a vertical line in order to maintain size desired. Each cam is designed to cut one size only with straight side and true angles.

The polygon box tool set forth herein is an improvement over U.S. Pat. No. 3,813,969. This tool uses less parts, the transverse slide is much lighter than the patented device-for instance, the patented transverse slide weighs about 40 oz. whereas the present transverse slide weighs about 5 oz. The revolutions per minute has increased in accordance with the reduction of weight; i.e., the rpm has increased from about 250 rpm to about 2000 rpm. One great advantage of the improved device over the patented device is the ability of using the same cam for contour forming as well as for other operations by use of different transverse slide. This device adds a new dimension wherein the width of the contour can be determined for different widths.

Obviously, since the cam follower is in the groove on the cam face, there is no need for any additional springs because the cam follower pin will follow the groove and will be guided within the groove without the aid of springs. Thus, the transverse slide operates with less parts.

The cam shaft has been shown screw threaded into the first drive link; any other type connection may be made which would be obvious to one skilled in the art.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A combination contour form and turning device which is mounted on a cross slide of an automatic screw machine, which comprises:
   a backing late for mounting said device on a cross slide of an automatic screw machine,
   a cam secured to said backing plate,
   a slide surrounding said cam for movement relative to said backing plate,
   a base plate mounted on roller bearings for movement relative to said slide,
   a polygon box tool mounted on said base plate for forming desired contours on a work piece,
   a cam follower secured to said base plate for movement of said base plate and said polygon box tool in accordance with a contour of said cam,
   stop means for stopping an advancement of said polygon box tool, and
   means for advancing said backing plate which advances said polygon box tool parallel with a centerline of a work piece in order to form a contour of a desired width.

* * * * *